United States Patent [19]

Davis

[11] Patent Number: 4,619,341

[45] Date of Patent: Oct. 28, 1986

[54] THROTTLE-GRAB BAR APPARATUS FOR SNOWMOBILES

[76] Inventor: Vern E. Davis, Box 744, Homedale, Id. 83628

[21] Appl. No.: 742,012

[22] Filed: Jun. 6, 1985

[51] Int. Cl.⁴ ............................................. B60K 26/00
[52] U.S. Cl. ..................................... 180/335; 74/479; 74/488; 74/551.8
[58] Field of Search ............... 180/190, 191, 192, 193, 180/335; 74/551.8, 551.1, 479, 489, 488

[56] References Cited

U.S. PATENT DOCUMENTS

| | | | |
|---|---|---|---|
| 1,738,855 | 2/1929 | Thompson | 74/551.8 |
| 3,561,815 | 2/1971 | Stone | 74/551.1 |
| 3,592,279 | 6/1971 | Donelson | 180/185 |
| 3,698,497 | 10/1972 | Bombardier | 180/190 |
| 3,794,131 | 2/1974 | Freedman et al. | 180/184 |
| 3,875,819 | 4/1975 | Haffner | 74/489 |
| 3,877,535 | 4/1975 | Gorski | 180/190 |
| 4,250,770 | 2/1981 | Robertson | 74/551.8 |
| 4,286,682 | 9/1981 | Stewart | 180/190 |

FOREIGN PATENT DOCUMENTS 20343 of 1896 United Kingdom ............... 74/551.1

Primary Examiner—John A. Pekar
Attorney, Agent, or Firm—Paul F. Horton

[57] ABSTRACT

An accessory for snowmobiles for safety and increased mobility including a throttle control mounted on each of the handlebars and a grab bar mounted between the handlebars. On hillsides and on sharp turns, throttle control is maintained by either hand while the other hand engages the grab bar for stability. The two throttle controls may be connected by an adjustable tie bar for simultaneous movement of the two controls.

9 Claims, 2 Drawing Figures ers designated by the numerals 20 and 30, respectively.

THROTTLE-GRAB BAR APPARATUS FOR SNOWMOBILES

BACKGROUND OF THE INVENTION

1. Field of the Invention

This invention relates, in general, to snowmobiles, and, more particularly to structural additions to snowmobiles for maintaining stability and throttle control.

2. Brief Description of the Prior Art

It is very important in the operation of snowmobiles that the operator maintain his physical stability on the machine and also maintain as much control over the functioning of the machine as possible. Riding the snowmobile across a steep slope or while making sharp turns, often results in loss of control and stability-sometimes with serious consequences. This is particularly true when using high performance machines during racing competition.

With existing snowmobiles, once the operator loses his grip on the simple throttle control, the machine is out of control, throttle-wise, and the operator is impotent to control the speed of the machine, which immediately decelerates where it may be highly advantageous, both for reasons of safety and performance, to maintain speed or to accelerate. Further, once the operator has lost his grip on the throttle control, he must grab onto the single remaining handlebar, which he can still reach, in order to attempt to maintain his own stability on the machine. By doing so, his guidance of the machine is severly limited and accidents readily occur.

SUMMARY OF THE INVENTION

The present invention overcomes the loss of stability and throttle control by providing on a snowmobile having a pair of handlebars for steering, two throttle controls, each control mounted on one of the opposing handlebars, and a grab bar mounted between the handlebars, so that the operator, under the extremely adverse conditions of high speed and sharp turns, or while riding across steep slopes, may maintain his personal stability by grasping the grab bar with one hand while manipulating the throttle control available in his direction of lean, with the other hand. A more thorough description of the invention may be found in the appended claims.

It is therefore a primary object of the present invention to provide on a snowmobile having a pair of handlebars, a throttle control on each handlebar and a grab bar located therebetween.

It is also an object of the present invention to provide a throttle control on each handlebar, of the grip-type, the throttle controls being connected by an adjustable tie rod for simultaneous control of each.

It is another object of the present invention to provide a snowmobile having a centrally located grab bar to facilitate entering and exiting the machine.

It is a general object of the present invention and of paramount importance to provide an accessory to a snowmobile which gives the operator superior stability while at the same time providing superior throttle control for improved safety and performance.

Additional objects and advantages will become apparent and a more thorough and comprehensive understanding may be had from the following description taken in conjunction with the accompanying drawings forming a part of this specification.

DETAILED DESCRIPTION OF THE INVENTION

Figure 1:
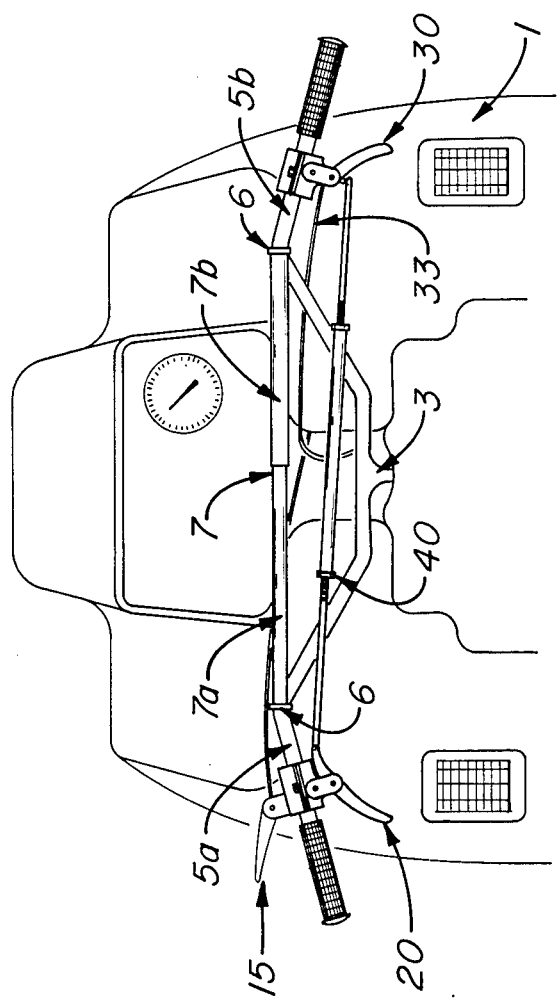
FIG. 1 is a top perspective view in partial section of one embodiment of the present invention, shown mounted on a snowmobile.

Referring now to the drawings, an embodiment to be preferred of the apparatus, made according to the present invention, is disclosed. The apparatus includes a grab bar 7 and a pair of throttle control members designated by the numerals 20 and 30, respectively.

Grab bar 7 is mounted to the existing pair of handlebars 5a and 5b by means of clamps 6 or by any other suitable means. Handlebars 5a and 5b, as is conventional, arise from a common fork 3 in slightly rearward divergence and then diverge backwardly and outwardly, as shown in FIG. 1. Grab bar 7 is preferably attached to each of the opposing handlebars adjacent their greatest curvature. The grab bar is preferably circular in cross-section and of a diameter which is conducive to maintaining a firm grip with the fingers about the bar. The grab bar may be constructed of two tubular telescoping sections 7a and 7b with section 7a being of suitable outside diameter to snugly engage the interior surface of section 7b, for adjusting the length of the bar to a suitable length dependent upon the machine to which it is installed and the preference of the operator. Once installed, a covering such as leather may be wrapped about the grab bar for providing a non-slip surface.

Figure 2:
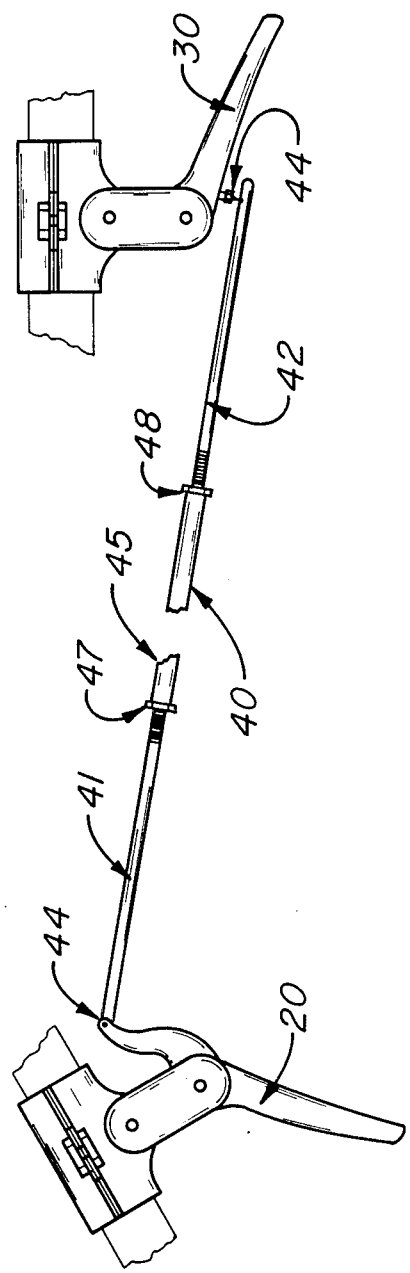
FIG. 2 is a plan view of the throttle control apparatus of the present invention.

Mounted onto each handlebar 5a and 5b is a throttle control, designated by the numerals 20 and 30, respectively. Each throttle control may be connected directly to the throttle by independent cables such as cable 33, shown in FIG. 1 or, as is preferred, throttle 30, conventionally located on the opposite handlebar from the brake control 15, is connected by cable to the throttle and throttle control 20 is, in turn, connected to throttle 30 by an adjustable tie rod 40. The tie rod, shown to advantage in FIG. 2, includes a pair of tubular rods 41 and 42, each pivotally connected to a respective throttle control 20 and 30, of the grip-type, as by a hinge pin or by a ball and socket member, designated generally by the numeral 44. Rods 41 and 42 are each provided with oppositely wound threads which engage the threads of a centrally disposed turnbuckle 45. A pair of threaded nuts 47 and 48 allow the tightening or loosening of the turnbuckle for manipulating the length of the tie rod. Each of the throttle controls is pivotally clamped to a respective handlebar by conventional clamp members.

In operation, and assuming a sharp left turn is being made at relatively high speed, as may be imagined in viewing FIG. 1, the operator leans far to the left to maintain his balance against the centrifugal force pulling him to the right. In leaning far to the left, the operator's hand must leave go of the throttle control grip 30. Under ordinary circumstances, the snowmobile 1 would slow down until the turn is completed or until speed has declined sufficiently for the operator to maintain a substantial upright position. During this interim, throttle control by the operator is absent. With the apparatus of the present invention, however, the operator continues to apply pressure to the throttle control grip 20 with the thumb of his left hand to maintain speed, accelerate, or decelerate, as he wishes. While leaning left, the operator grabs the grab bar 7 with his right hand to provide support for his body while still contributing to the steering control of the machine. It is then, this combination of grab bar and throttle controls which allow superior control of the snowmobile by the operator for greater safety and greater speed. It is to be noted that neither the grab bar alone, or the extra throttle control alone will provide this superiority, but rather that the grab bar is necessary to maintain the stability of the operator while the operator manipulates the throttle control with his other hand. It is also to be noted that during normal operation, thumb fatigue may be prevented by alternating the grip on the two throttles.

Having thus described in detail a preferred embodiment of the present invention, it is to be appreciated and will be apparent to those skilled in the art that many physical changes could be made in the apparatus without altering the inventive concepts and principles embodied therein. The present embodiment is therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. In combination with a snowmobile having a pair of handlebars for steering:

two throttle controls, each of said throttle controls mounted on a separate handlebar and each of said throttle controls connected to a single throttle by means of a flexible cable; and a grab bar extending between said handlebars.

2. The apparatus as described in claim 1 further comprising a tie rod for connecting one of said throttle controls to a throttle control located on an opposing handlebar.

3. The apparatus as described in claim 2 wherein said tie rod is adjustable as to length.

4. The apparatus as described in claim 1 wherein said grab bar is adjustable in length.

5. The apparatus as described in claim 4 wherein said grab bar includes two or more telescoping sections.

6. The apparatus as described in claim 1 wherein said grab bar is substantially circular in cross-section.

7. In combination with a snowmobile having a pair of oppositely disposed handlebars for steering:

a pair of grip-type throttle controls one of said throttle controls mounted on each of said handlebars;

a grab bar extending between said handlebars and affixed thereto; and a tie rod connecting each of said throttle controls together for operation of the throttle by either hand of the operator.

8. The apparatus as described in claim 7 wherein said tie rod is adjustable as to length.

9. The apparatus as described in claim 7 wherein said grab bar includes at least two telescoping sections.

* * * * *